Dec. 23, 1947.  P. R. RUND  2,433,066
APPARATUS FOR ASSEMBLING CAN PARTS
Filed April 8, 1943  2 Sheets-Sheet 1
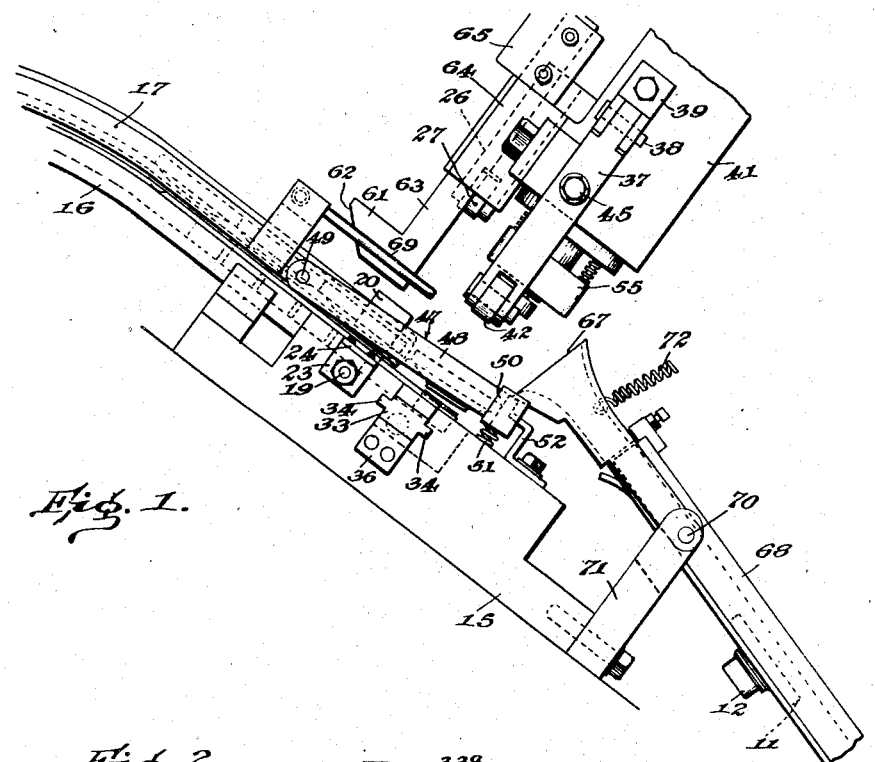
Inventor
Paul R. Rund
By Rule & Hoge
Attorneys Dec. 23, 1947.  P. R. RUND  2,433,066
APPARATUS FOR ASSEMBLING CAN PARTS
Filed April 8, 1943  2 Sheets-Sheet 2
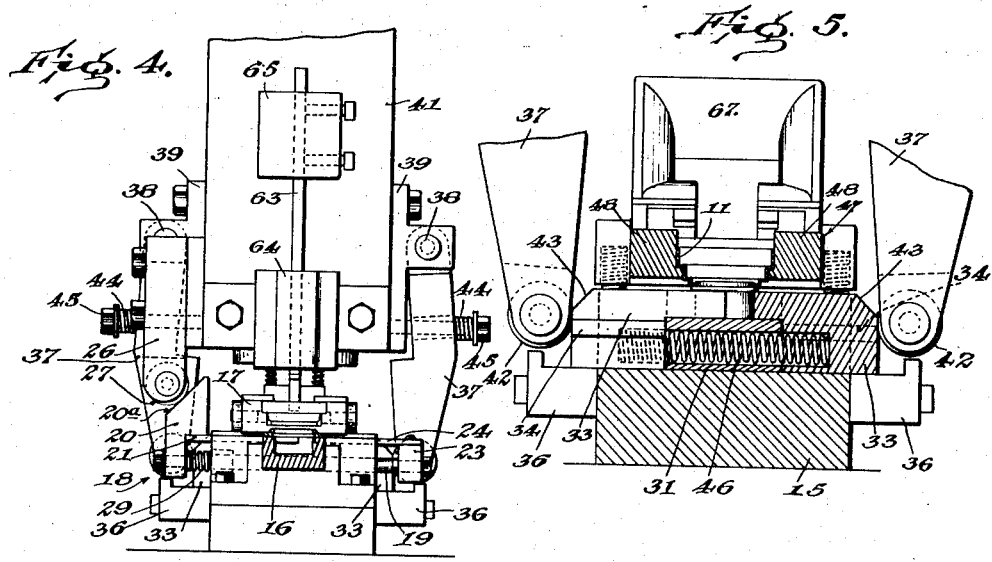
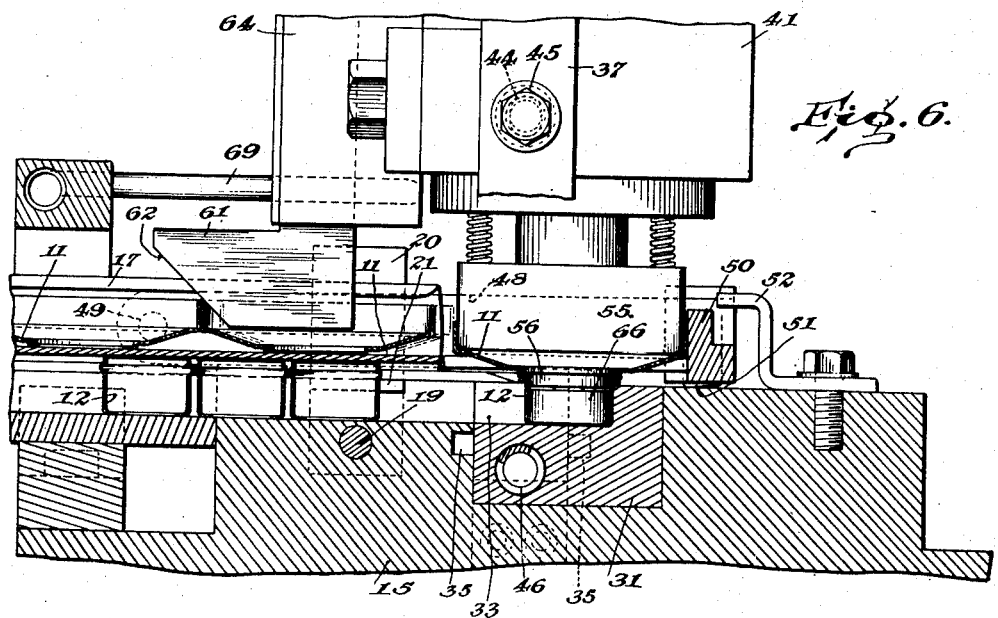
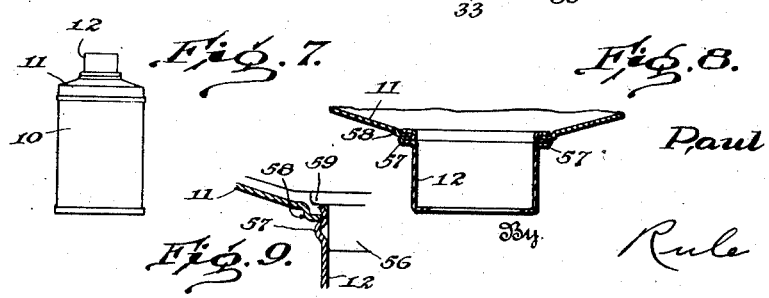
Inventor
Paul R. Rund
By
Rule & Hoge
Attorneys Patented Dec. 23, 1947

2,433,066

UNITED STATES PATENT OFFICE 2,433,066

APPARATUS FOR ASSEMBLING CAN PARTS

Paul R. Rund, Middle River, Md., assignor, by mesne assignments, to Continental Can Company, Inc., New York, N. Y., a corporation of New York Application April 8, 1943, Serial No. 482,281

1 Claim. (Cl. 113—1)

My invention relates to mechanism for assembling parts of cans or other containers or articles, and is particularly adapted for assembling the neck portion or collar of a can with the breast which is to be attached to and form the upper end of the can body.

An object of the invention is to provide a novel and improved apparatus for automatically feeding the parts into position to be united or fastened together by means of a die.

More specifically, an object of the invention is to provide an automatic assembling apparatus comprising means for feeding a continuous row of collars to an assembly position, means for advancing a row of the breasts into juxtaposed relation to the collars at the assembling station, and a die operable to clinch the parts in assembled relation.

Other objects of the invention will appear hereinafter.

Referring to the accompanying drawings:

Fig. 1 is a side elevation of mechanism embodying the present invention.

Fig. 2 is a view looking downward on the assembly mechanism of Fig. 1 in a direction normal thereto, but with the die omitted.

Fig. 3 is a part-sectional view showing particularly the collar-feeding device and the means for holding the collars during the operation of the die.

Fig. 4 is an end view of the apparatus shown in Fig. 1.

Fig. 5 is a cross section at the line 5—5 on Fig. 3.

Fig. 6 is a longitudinal sectional elevation of the apparatus on a comparatively large scale, parts being broken away.

Fig. 7 is a diagrammatic view of a can.

Fig. 8 is a fragmentary, sectional view showing the assembled collar and breast.

Fig. 9 is a fragmentary, sectional view showing the parts at an intermediate stage in the collar-clinching operation.

The apparatus as illustrated, is adapted for assembling work-pieces which form parts of sheet metal cans such as shown in Fig. 7, comprising a body 10, a breast 11, and a collar 12. The apparatus comprises a base plate 15 supported in an inclined position, and an inclined track or runway 16 along which the collars 12 move by gravity toward the assembly station. The breast pieces 11 are advanced along a track 17 directly over and parallel with the track 16.

The collars 12 may be advanced in an unbroken row (Fig. 3) to a collar-feeder device 18 which provides a stop for said row and operates to feed the collars singly and in succession to the assembly position. The feeder 18 comprises a rod 19 extending transversely through the base plate 15 and slidable therein. Attached to the rod 19 adjacent one end thereof, is an upstanding cam 20 having an inclined cam surface 20ª. A feeder plate 21 attached to the cam 20 and projecting inwardly therefrom, has an inclined forward end surface 22, so that the plate serves as a cam or wedge. Attached to the opposite end of the rod 19 by means of a block 23 (Fig. 4), is a plate 24, the forward end of which provides a bearing surface 25 curved to conform to the curvature of the collars.

The feed device 18 is adapted to be reciprocated lengthwise and is moved in one direction by means of an arm 26 mounted on the die (hereinafter described) and carrying a cam follower roll 27 which runs on the cam surface 20ª. As the die is lowered, it operates through the cam 20 to move the feed device 18 in one direction, thereby withdrawing the holding surface 25 and permitting the foremost collar 12 to be moved by the cam 22 toward the assembling position. The feed device is returned by means of a coil compression spring 29.

When a collar 12 is fed forward to the assembly position, it is arrested by a stop block 31 which has a stationary mounting in the base plate 15 and is formed with a semicircular stop surface 32 (Fig. 3) conforming to the curvature of the collar. Cooperating with the stop block is a collar holder comprising a pair of holding plates 33 in the form of slides, each provided with an arc-shaped holding surface 33ª. The holding plates 33 extend transversely of the base plate 15 and are mounted for reciprocation therein, and for this purpose are provided with ribs 34 which are slidable in guideways 35 (Fig. 6) formed in the base plate. The slides 33 are supported in part by bearing blocks 36 bolted to the base plate, and are moved inwardly to a collar-holding position as shown in Fig. 3, when the die descends.

The means for moving the slide plates 33 comprises a pair of rock arms 37 connected by pivot pins 38 to brackets 39 bolted to the die-carrying frame 41. Rolls 42 on the lower ends of the arms 37 are arranged to engage inclined surfaces 43 on the ends of the plates 33 as the die 41 descends, thereby forcing said plates inwardly to cap-holding position. Coil compression springs 44 mounted on posts 45 attached to the brackets 39, hold the arms 37 with a yielding pressure against the plates 33. When the die is withdrawn, the holding plates 33 are retracted by means of a coil spring 46.

The breasts 11 are fed forward in an unbroken row or line until they reach the forward end of the channel 17 where they are transferred to a swinging carrier or frame 47 which positions them at the assembly station. Said frame comprises a pair of side bars 48 connected at one end to a pivot rod 49, the frame including a cross bar 50 at its forward end. A coil spring 51 (Fig. 1) holds the frame in a slightly inclined position relative to the base 15 so as to prevent interference between the breast 11 and the collar 12 thereabeneath. The upward swinging movement of the frame is limited by a stop arm 52.

The die comprises a die member 55 (Fig. 6) shaped to conform to the contour of the breast 11 and having a cylindrical extension 56 to pass through the opening. When the frame 41 descends, the die 55 enters the breast which has been brought to the assembly position above and in register with a collar 12 and forces the breast downward so as to surround the collar. During this movement the extension 56 of the die, enters the upper end of the collar as shown in Fig. 9. The frame 47 is also lowered by such movement.

The collar 12 is formed with an annular bead 57 on which the inner rim 58 of the breast seats as the die is lowered. The continued downward movement of the die causes a shoulder 59 thereon (Fig. 9) to seat on the rim of the collar and bend it outwardly in the form of an annular flange. The continued movement of the die completes the clinching operation by bending this flange down flat against the margin 58 of the breast and compressing and flattening the bead 57, thereby completing the operation as shown in Fig. 8.

During this clinching operation, the oncoming breast pieces 11 are held back by a holding device 61 in the form of a vertically disposed plate having one end inclined to provide a cam surface 62. The holding device includes a shank 63 which is slidably mounted for up-and-down movement in a plate or bracket 64 mounted on the die frame 41. The holder 61 is held down by a weight 65 attached to the shank 63. When the die descends, holder 61 enters the breast piece 11 directly behind the one which is being assembled and the cam 62 engages the end wall of the breast piece and forces it and those behind it, rearwardly a short distance, thus spacing them from the parts which are being assembled and thereby preventing interference with the assembling operations.

When the die is lifted, the assembled breast and collar are held thereon by friction and lifted to a discharging position, and then released by a spring-pressed knock-out device including a disk 66 (Fig. 6) which forms a part of the die. The work-piece when thus released, is discharged into and through a funnel 67 in alignment with a chute 68 through which the assembled work-piece passes. An air nozzle 69 through which a continuous blast of air may be discharged, blows the work-piece into the funnel. As the funnel projects into the path of the die, it is pivotally mounted on a standard 71 by means of pivot pins 70, to swing downward as the die descends and is returned by a spring 72.

Modifications may be resorted to within the spirit and scope of my invention.

I claim:

An apparatus for attaching a collar to the breast of a sheet metal can body comprising a die mounted for reciprocation, a collar supporting means disposed beneath said die in axial alignment therewith, a lower guideway along which collars are advanced in a row and brought in succession to the collar supporting means beneath the die, a breast holder disposed beneath the die and over said collar supporting means, an upper guideway along which breasts are advanced in a row and brought in succession to said holder, means for yieldingly supporting said holder, said die being provided with means for engaging the holder for moving said holder downward and thereby bringing the breast thereon into position to be assembled with the collar therebeneath, said die operating to assemble the breast on the collar and for securing the breast to the collar.

PAUL R. RUND.

REFERENCES CITED

The following references are of record in the file of this patent:

UNITED STATES PATENTS

| Number | Name | Date |
|---|---|---|
| 492,076 | Walsh | Feb. 21, 1893 |
| 1,721,264 | Taylor | July 16, 1929 |
| 2,089,126 | Kronquest | Aug. 3, 1937 |
| 1,369,921 | Erhard | Mar. 1, 1921 |
| 1,571,673 | Jayne | Feb. 2, 1926 |
| 1,705,924 | Kaplan | Mar. 19, 1929 |
| 1,529,746 | McDonald | Mar. 17, 1925 |
| 2,183,600 | Werver | Dec. 19, 1939 |

FOREIGN PATENTS

| Number | Country | Date |
|---|---|---|
| 170,337 | Great Britain | Oct. 21, 1921 |